US008340719B1

(12) United States Patent
Zands

(10) Patent No.: US 8,340,719 B1
(45) Date of Patent: Dec. 25, 2012

(54) MOBILE PHONE MESSAGE MANAGEMENT

(75) Inventor: Jan Zands, Santa Monica, CA (US)

(73) Assignee: Goldenview Solutions, LLC, Santa Monica, CA (US)

( * ) Notice: Subject to any disclaimer, the term of this patent is extended or adjusted under 35 U.S.C. 154(b) by 69 days.

(21) Appl. No.: 12/854,034

(22) Filed: Aug. 10, 2010

(51) Int. Cl.
*H04W 88/02* (2009.01)
(52) U.S. Cl. .................. 455/556.1; 455/404.2; 455/436
(58) Field of Classification Search ............... 455/556.1, 455/404.2, 411, 412.1, 414.1
See application file for complete search history.

(56) References Cited

U.S. PATENT DOCUMENTS

| 8,121,626 | B1* | 2/2012 | Kirchhoff et al. | 455/466 |
| 2008/0108319 | A1* | 5/2008 | Gallagher | 455/404.2 |
| 2011/0287748 | A1* | 11/2011 | Angel et al. | 455/414.1 |

* cited by examiner

*Primary Examiner* — Diane Mizrahi
(74) *Attorney, Agent, or Firm* — Marc E. Hankin; Kevin Schraven; Hankin Patent Law, APC

(57) ABSTRACT

Techniques are described for managing messages with a mobile phone. First user input is received that indicates a first active call record from a list of active call records. In response to the first user input, a call is initiated from a mobile device to a particular target indicated by the first active call record. After completion of the call, the mobile device prompts for second user input to update the status of the list of active call records. In one embodiment, a second active call record is created for the connection in response to the second user input. The second active call record may automatically populated with notes from the first active call record.

16 Claims, 12 Drawing Sheets

FIG. 10

MOBILE PHONE MESSAGE MANAGEMENT

TECHNICAL FIELD

The present invention relates generally to message management and, more specifically, techniques for managing phone messages from a mobile device.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In many work environments, managing telephone calls and written messages resulting from telephone calls that are missed, not completed, or received when the called party is unavailable, is a critical task. Successful workflow often depends on a person's ability to track numerous incoming and outgoing messages and quickly prioritize those calls that require immediate action. Traditional record-keeping methods include written phone logs, written memos or notes, or delegation to a third-party such as an administrative assistant. However, in instances where call volume is high or multiple phone lines need to be managed, there is a risk of misplacing or overlooking an important call. This scenario can result in missed business opportunities or frustrated clients whose calls are not returned in a timely fashion.

Many mobile phones, including smartphones, keep a historical log of calls received at and placed from that device. The record is organized according to the time the call occurred without an indication of priority, content or need for additional follow-up. Furthermore, call history is restricted to communication to/from that device and does not reflect the call history of other pertinent phone numbers associated with the business such as an office land line.

BRIEF DESCRIPTION OF THE DRAWINGS

In the drawings:

FIG. 10 is a screenshot of a browser application displaying a website through which message records may be created, viewed, and edited;

DETAILED DESCRIPTION

Figure 1:
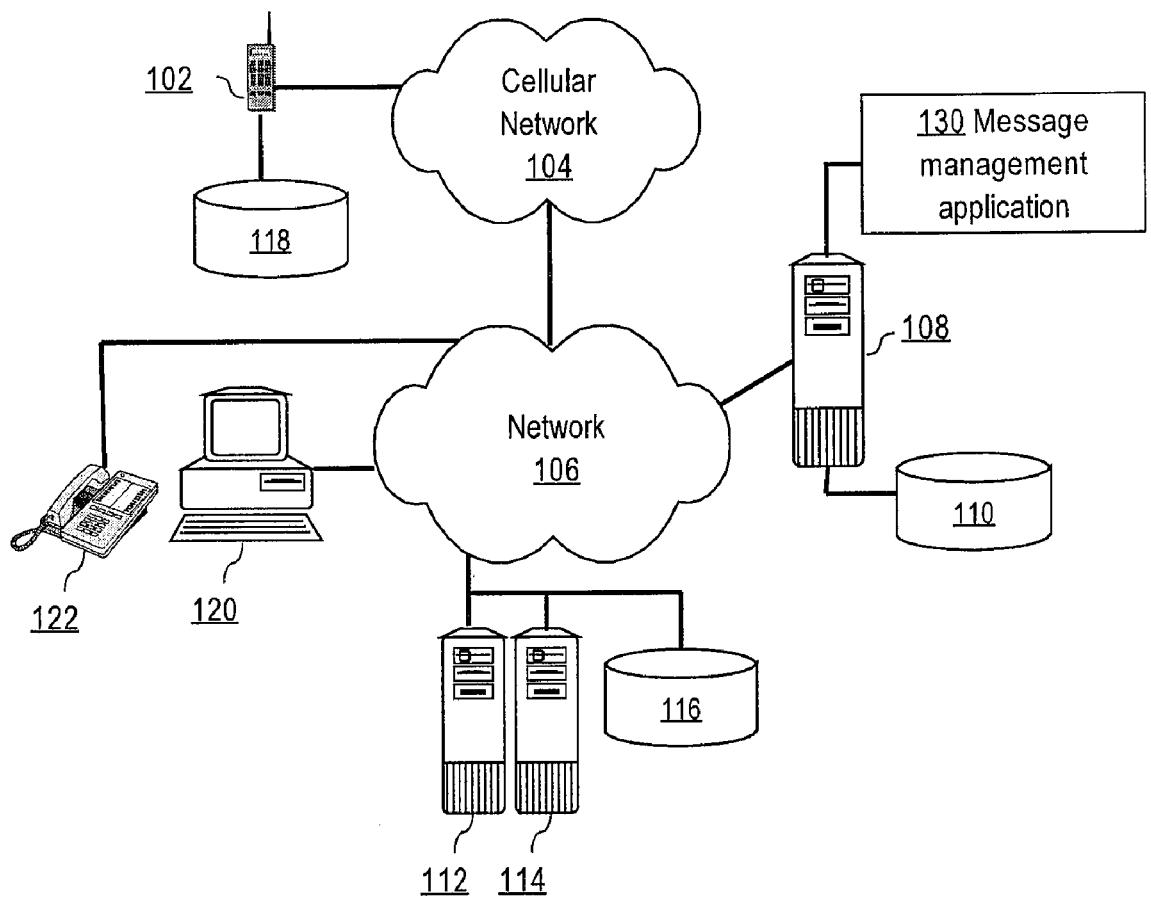
FIG. 1 illustrates a communications system.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Process and Mobile Phone Interface for Managing Phone Messages
    3.1 Generating and Displaying an Active Message Record List on a Mobile Device
    3.2 Selecting Message Records and Connecting to a Target
    3.3 Automatic Message Management in Response to Completion of a Connection
4.0 Web Interface for Managing Call Records
5.0 Implementation Mechanisms—Hardware Overview
6.0 Extensions and Alternatives

1.0 General Overview

Techniques for managing messages via a mobile phone are described herein. In an embodiment, first user input is received that selects or indicates a first active call record from a list of active call records. The first user input is received in a message management application program running on the mobile phone or smartphone. The database may be stored in the mobile phone or may reside in external storage that is accessible over a wireless network or packet switched network. In response to the first user input and from within the message management application program, a call is initiated from a mobile device to a particular target indicated by the first active call record. After completion of the call, execution of the message management program resumes and the mobile device prompts for second user input to update the status of the list of active call records.

In one embodiment, a second active call record for the particular target is created in the database in response to receiving the second user input. The second active call record may be automatically populated with information from a call log that the mobile phone maintains using a built-in or "native" phone application or operating system. The second active call record may also be automatically populated with one or more notes from the first active call record. In one embodiment, the method comprises receiving user input to add new notes to the second active call record. The new notes are displayed above or otherwise in association with the one or more notes from the first active call record.

In one embodiment, the method comprises deactivating the first active call record in response to the second user input. Deactivating the first active call record removes the first active call record from the active call list and adds the first active call record to an archive of inactive call records. Deactivating may comprise marking the call record in the database with a Boolean value or other value indicating that the record is active.

In one embodiment, each active call record on the list of active call records is color-coded based on an associated call type.

In one embodiment at least one active call record on the list of active call records is created by a remote computer or other device that is different from the mobile phone. For example, an administrative assistant or other user of a separate computer could create call records in a call database that is stored in the separate computer, or in a remote server that is networked to the separate computer and also accessible to the mobile device. Call records may be pushed to the mobile device by a remote server. Additionally or alternatively, the mobile device may periodically connect to the remote server and download a copy of call records pertaining to the mobile device, including call records that were previously created in the database at the remote server by a user of the separate computer.

In other embodiments, the invention encompasses a computer apparatus and a computer-readable medium configured to carry out the foregoing steps and functions.

2.0 Structural and Functional Overview

FIG. 1 illustrates a communications system. Mobile phone 102 sends and receives radio signals with one or more cellular radiotelephone sites that are located in a cellular network 104. Mobile phone 102 is configured to send and receive voice calls and other data wirelessly through cellular network 104. Mobile phone 102 may also be configured to send and receive voice and other data directly through network 106, for example by connecting to a wireless access point. In an embodiment, mobile phone 102 is a smartphone such as a BlackBerry® device from Research in Motion, Inc., or an iPhone® device from Apple, Inc. In other embodiments, mobile phone 102 may comprise any form of computing device that is equipped with phone functions. For example, mobile phone 102 could be a laptop computer or netbook computer with soft IP phone software, a microphone and loudspeakers or headset.

Cellular network 104 is interconnected with network 106. Network 106 may comprise one or more disparate networks through which voice and other data may be routed, according to conventional techniques, to a connected target device; the network 106 may comprise a packet data network. Thus, voice and other data may be sent from mobile phone 102 on cellular network 104 to a target device on network 106. Conversely, voice and other data may be sent from a target device on network 106 to mobile phone 102. Cellular network 104 may also directly route voice and other data to target devices directly connected to cellular network 104. Also, if mobile phone 102 is directly connected to network 106, mobile phone 102 may bypass cellular network 104 and send voice and other data directly over network 106. In certain embodiments, networks 104, 106 may be integrated or indistinguishable.

Server 108 hosts one or more computer program applications 130, stored on database 110 or other networked storage of the server, that may be installed on mobile phone 102 and used to manage phone calls and associated messages according to techniques described below. In an embodiment, application 130 is Phonesheet, commercially available from Goldenview Solutions, LLC at the web site phonesheet.com. The server 108 may comprise a File Transfer Protocol (FTP) server, a Hypertext Transfer Protocol (HTTP) server (e.g., a web server), or any other type of conventional server from which applications may be downloaded and installed on mobile phone 102. Message management application 130 may be hosted by a third-party, such as a vendor that provides applications for mobile phone 102 through an online application store. Alternatively, message management application 130 may be hosted by web server 114, which also hosts a website that allows call records for mobile phone 102 to be created, viewed, and edited.

Once message management application 130 is installed on mobile phone 102, message management application 130 automatically synchronizes with database 116 in order to store incoming and outgoing messages according to the techniques described below. Mobile phone 102 communicates through mobile server 112 in order to access database 116. Thus, mobile server 112 may receive and send data regarding call records to mobile phone 102 that are stored in database 116.

In one embodiment, the message management application 130 creates local database 118 on mobile phone 102. Local database 118 may be synchronized with database 116 so that both databases contain the same call records. In such an embodiment, mobile phone 102 only needs to communicate with mobile server 112 when there is an update to the call records. Alternatively, call records may be entirely maintained at local database 118, reducing the storage requirements of database 116 and alleviating the need to communicate with mobile server 112. Call records could also be entirely maintained on database 116, reducing storage requirements for mobile phone 102.

Web server 114 hosts a website that may be accessed to update and maintain call records stored in database 116 and/or databases 118. In one embodiment, a user of message management application 130 creates an account through the website hosted by web server 114. Once the account has been created, the user may access the account through the website in order to create, view, or edit call records. The user may also use a copy of message management application 130 that is installed on mobile phone 102 to create, view or edit the call records without connecting to the website.

Message records from other phones and devices may also be created and pushed to mobile phone 102. For example, an administrative assistant may answer office phone 122, which may be coupled to network 106. Even though the administrative assistant may not have access to mobile phone 102, the administrative assistant can create a new call record through the website by logging on to the user's account through computer 120, which is coupled to network 106, and entering the message information into a call record form. The call record created by the administrative assistant is then pushed to mobile phone 102 by mobile server 112. Alternatively, mobile phone 102 connects to server 108 and requests a copy of newly created call records.

3.0 Process and Interface for Managing Phone Messages

Figure 10:
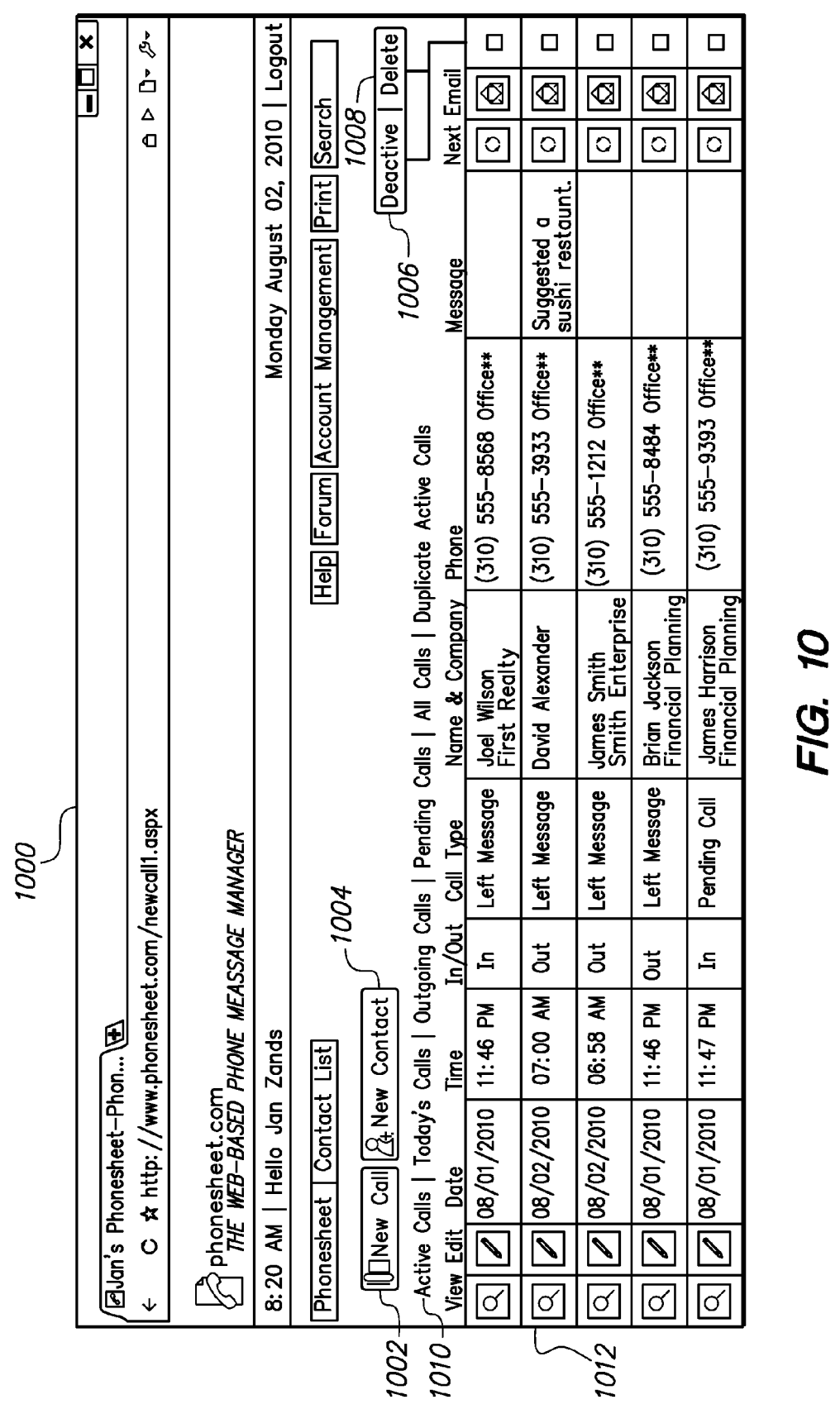
Figure 11:
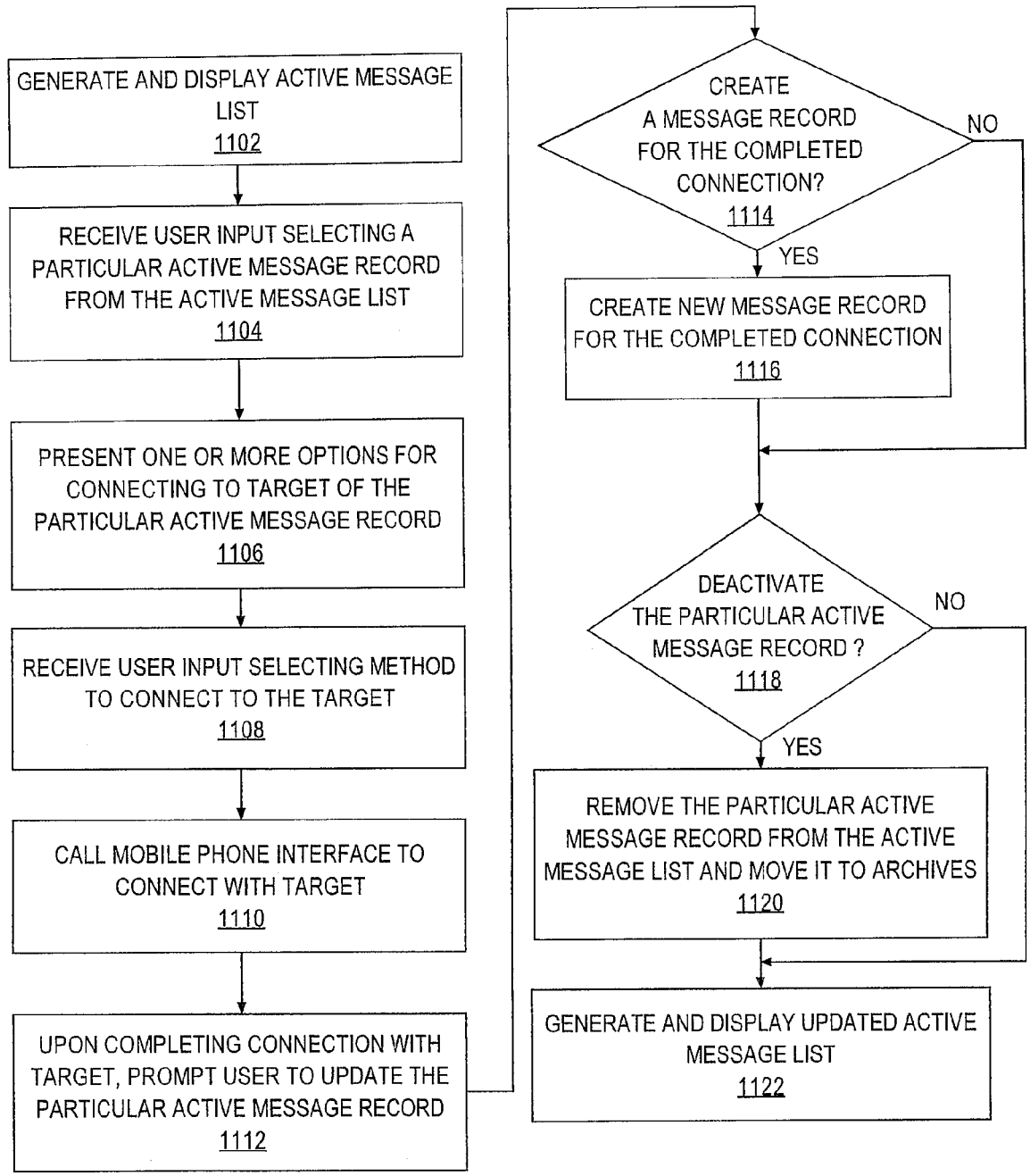
FIG. 11 illustrates a process for managing messages from a mobile device.

A process for managing messages from a mobile device according to an embodiment is outlined in flow diagram FIG. 11 (step 1102 to step 1122). Sample screen displays of a mobile phone performing specific steps referenced in FIG. 11 are shown in FIGS. 2 through 10, which are described in more detail below.

3.1 Generating and Displaying an Active Message Record List on a Mobile Device

In step 1102, an active message list is generated and displayed. An active message list comprises one or more active message records. In one embodiment, active message records may be generated by both a mobile phone and one or more remote devices. For example, an administrative assistant may answer a phone call on an office phone or receive an email on an office computer and create an active message record through a web interface. These records are combined with the records generated on the mobile phone. Thus, the active message list consolidates and displays active message records that may be generated by a plurality of devices.

Figure 2:
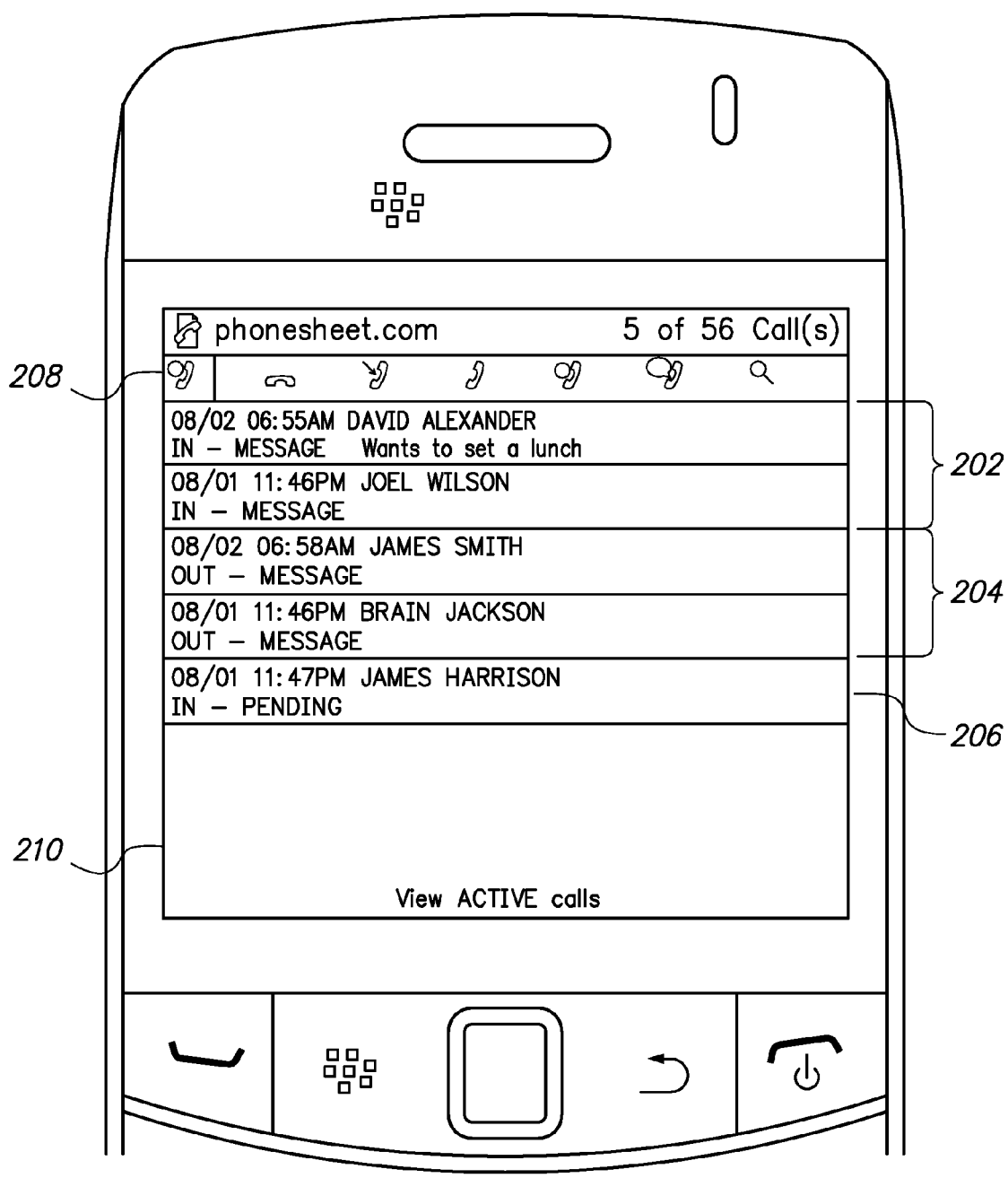
FIG. 2 is an example screen display for a mobile device showing a list of active call records.

FIG. 2 illustrates executing an application to manage an active message list, according to one embodiment. In an embodiment, application 130 is downloaded from web server 114 and installed on mobile phone 102. In this embodiment, when the application is executing on the mobile phone, the user may view a Home Screen which comprises Active Calls List 210. Active Calls List 210 displays a list of active message records, which may be sorted based on call type. Each of the active call records 202-206 is associated with one or more tags that indicate the call type. For example, the tags may indicate whether a particular call is incoming (the user received or expects to receive an incoming call) or outgoing (the user made or expects to make a call). The tags may also indicate whether a message was left or the call is pending.

In FIG. 2, the first two active call records 202 have a call type of "IN-MESSAGE", indicating that a call was received from the party or target specified by the call record and that a message was left. The next two active call records 204 have a call type of "OUT-MESSAGE", indicating that a call was made by the user to the specified called party target and that a message was left. In an embodiment, the call type "MESSAGE" does not necessarily mean that a recorded message was left. For example, an incoming message may be left with a third party such as an administrative assistant who subsequently creates the call record. Also, an outgoing message may be left with a third party responsible for tracking calls for the called party. Active call record 206 has a call type of "IN-PENDING" indicating that an incoming call from the target is expected, but has not yet been received. Similarly, a call type of "OUT-PENDING" indicates a call expected to be made to a target.

In an embodiment, call records are color-coded using highlight colors according to call type. Each call record may be associated with a color based on its level of priority. For example, in one embodiment, active call records of call type "IN-MESSAGE" may have the highest priority, because a client may be expecting a return phone call. Thus, active call records of call type "IN-MESSAGE" may be highlighted one color (e.g., red), active call records of call type "OUT-MESSAGE" may be highlighted a second color (e.g., blue) and active call records of call type "PENDING" may be highlighted a third color (e.g., green). As a result, active call records of higher priority may be quickly identified based on their color.

In one embodiment, the active call records on the Active Call list 210 are sorted based on call type. For example, active call records of call type "IN-MESSAGE" may be displayed at the top of the list, followed by active call records of call type "OUT-MESSAGE," followed by active call records of call type "IN-PENDING" as shown in FIG. 2. Call records of the same call type may be sorted based on information stored within the call record, such as the date of the call record or the target of the call record. Thus, the highest priority active call records may be displayed at the top of the screen.

According to one embodiment, the user may change which call records are displayed based on filters 208. In an embodiment, filters 208 are represented by icons in the screen display. Referring to the icons in order from left to right in FIG. 2, when selected the first icon causes the mobile phone to display only active message records. The second icon causes the mobile phone to display message records, both active and inactive, from the current day. The third icon causes the mobile phone to display only incoming active message records. The fourth icon causes the mobile phone to display only outgoing active message records. The fifth icon causes the mobile phone to display only active messages with a call type of "PENDING." The sixth icon causes the mobile phone to display both active and inactive (or archived) message records. The seventh icon allows the user to perform a text search for call records.

3.2 Selecting Message Records and Connecting to a Target

In step 1104, user input is received that selects a particular active message record from the active message list.

Figure 3:
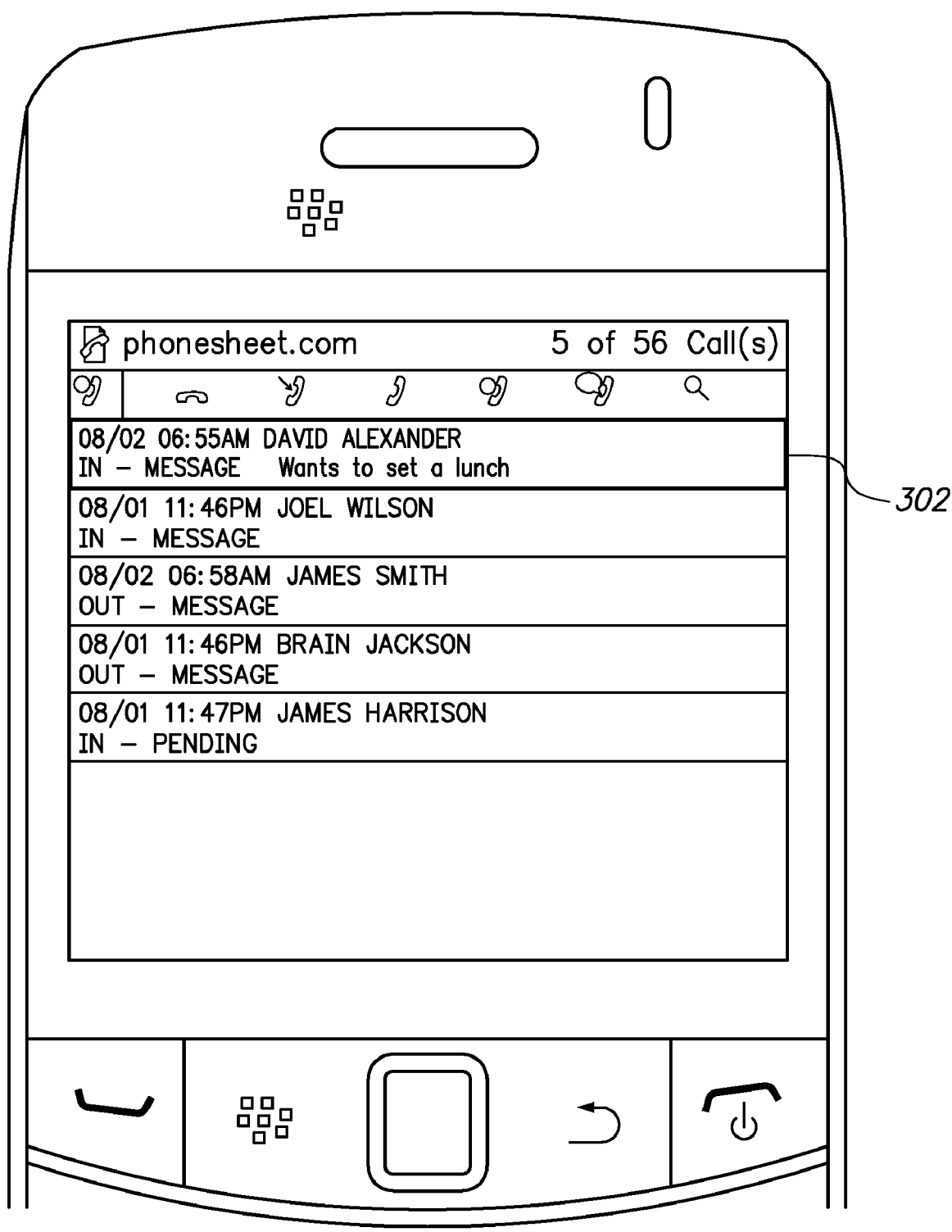
FIG. 3 is an example screen display for a mobile device showing a selection of an active call record.

For example, FIG. 3 illustrates a mobile phone display when a user selects a particular active call record from the Active Calls list. Using an input device on the mobile phone, the user may scroll through call records on the list and/or select a particular call record. A visual indicator is displayed to indicate which call record the user has currently selected. For example, in response to user input for selecting the first active call record 302, a yellow box is displayed around the perimeter of the active call record.

Next, at step 1106, application 130 presents the user with one or more options for connecting to the target of the particular active message record. According to one embodiment, the user is presented with the option to call, text, or email the target.

Figure 4:
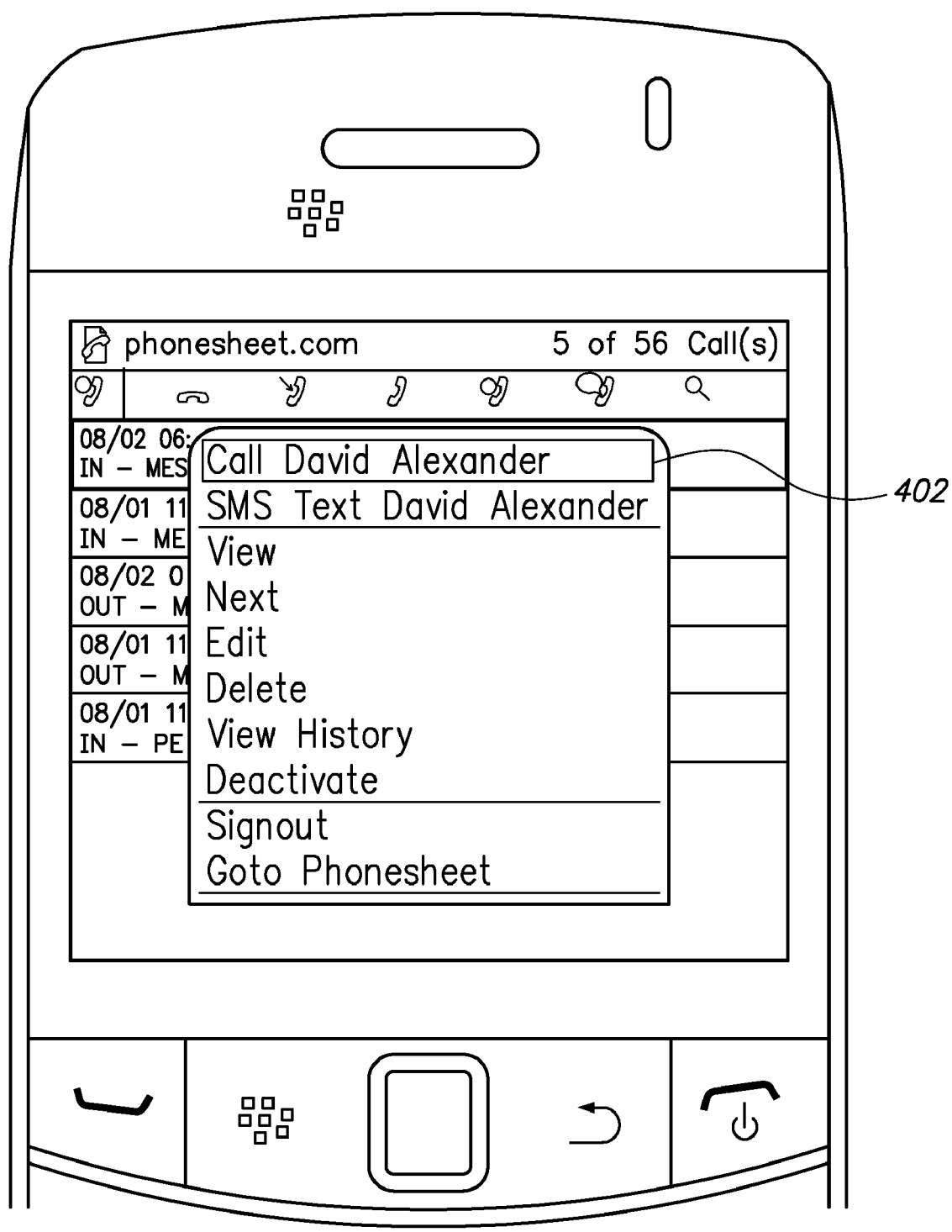
FIG. 4 is an example screen display for a mobile device showing multiple options to connect to a target.

FIG. 4 illustrates an example screenshot of a mobile phone's display showing menu options for a particular active call record, which are presented to a mobile phone user in response to the mobile phone user's selection of the particular active call record. As shown in FIG. 4, the user is presented with multiple options to connect to the target.

For instance, menu 402 includes the option to "Call" the target indicated by the selected active call record. In an embodiment, in response to receiving user input selecting a call option, message management application 130 invokes a separate application or interface on the mobile device, passing the phone number of the target of the active record. The application that is called may vary depending on the particular configuration or interface of the mobile phone. For example, Blackberry™ phones typically include a "Phone" application, which may be invoked in order to initiate a phone call.

Certain embodiments are used on multi-tasking smartphones so that application 130 may continue to run in a background configuration or mode while the called application performs phone call placement functions. When the call is completed, process control returns to application 130 and the user may perform further call and message management functions as further described herein. A benefit of the approaches herein is that the user is not required to exit or cease using the application 130 to perform call placement or management functions relating to call records or messages; instead, control is retained within the application and all appropriate call record management functions are available within the application.

Menu 402 also includes the option to send a Short Message Service Text ("SMS Text") message to the target indicated by the particular active record. Upon selection of this option, message management application 130 invokes a separate mobile phone application that enables the user to type and send an SMS message to the target. The application that is invoked may vary depending on the particular configuration or interface of the mobile phone.

Menu 402 may also include an option to send an email to the target of the selected active record. In an embodiment, the email option is only displayed if email information for the particular target is available in a contacts list or database managed by the mobile device. If the email address for the particular target has not been stored, then the user is not presented with an email sending option.

In addition to presenting the user with options to connect to a target, Menu 402 provides other options to manage the Active Call list. For example, Menu 402 includes an option to "View" the active call record. By selecting this option, the user is presented with more details associated with the selected active record that were not previously displayed by the Active Call list on the Home Screen. For example, more detailed contact information, such as the target's phone number, email address, and company information may be displayed.

Menu 402 item "Next" operates in the same manner as the "Call" menu item described above. Selecting this option causes the mobile phone to call the target of the selected phone record.

Figure 7:
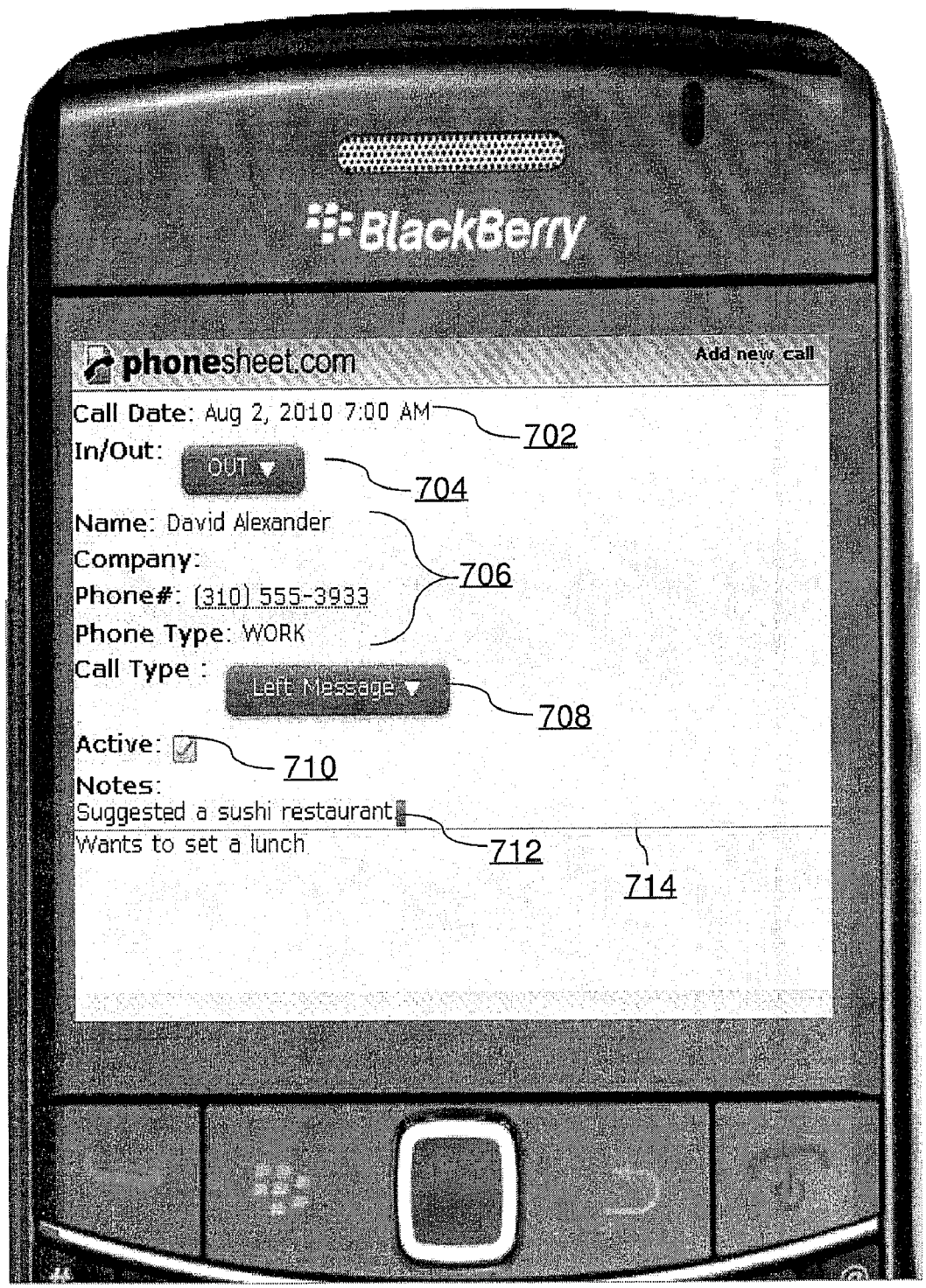
FIG. 7 is an example screen display for a mobile device showing a call record.

Menu 402 includes options to "Edit" and "Delete" the active call record. If the user selects the "Edit" option, then in response, a screen similar to that shown in FIG. 7 is displayed. The user may then edit the any details of the active record discussed below with reference to FIG. 7. If the user selects the option to "Delete" the active call record, the record is removed from the active call list and deleted from the database. Consequently, the active call record becomes unavailable and is not archived.

Menu 402 includes an option to "View History" for the call record. For example, during the course of a particular business matter or transaction, multiple incoming and outgoing calls may be sent and received from the particular target, resulting in creating a plurality of records. By selecting the "View History" option, a user may view all active and archived call records saved on the database for the particular target.

Menu 402 includes an option to "Deactivate" the active call record. By selecting this option, the active call record is removed from the Active Call list. The active call record becomes "inactive" and is added to the archived call records. Deactivating a call record may comprise the application 130 marking a flag value or Boolean value in the call record to indicate that the record is not active.

Menu 402 includes an option to "Signout" from message management application 130. When this option is selected, the call records are not viewable on the mobile device until the user signs back in to message management application 130.

Menu 402 shows a "Goto Phonesheet" shortcut, which may be incorporated into the menus of one or more applications, different from message management application 130, that are also installed on the mobile phone. By installing the shortcut, a user may quickly navigate to and launch (if needed) message management application 130 from a different application executing on the mobile phone. Thus, the menu items of separate applications may be altered by message management application 130 to provide the user quicker access for viewing call records.

Returning to the process shown in FIG. 11, step 1108 comprises receiving user input to indicate a method to connect to the target. In response to the user input, the mobile phone interface is called to connect to the target at step 1110. In one embodiment connecting to the target may comprise calling the target, sending a text, or sending an email. As part of step 1110, process control transfers to the called phone interface or application for conducting an outgoing call. When the call ends, the called interface or application completes processing and returns control to application 130, so that the user can manage a completed call record or the previously used call record without exiting application 130.

Figure 5:
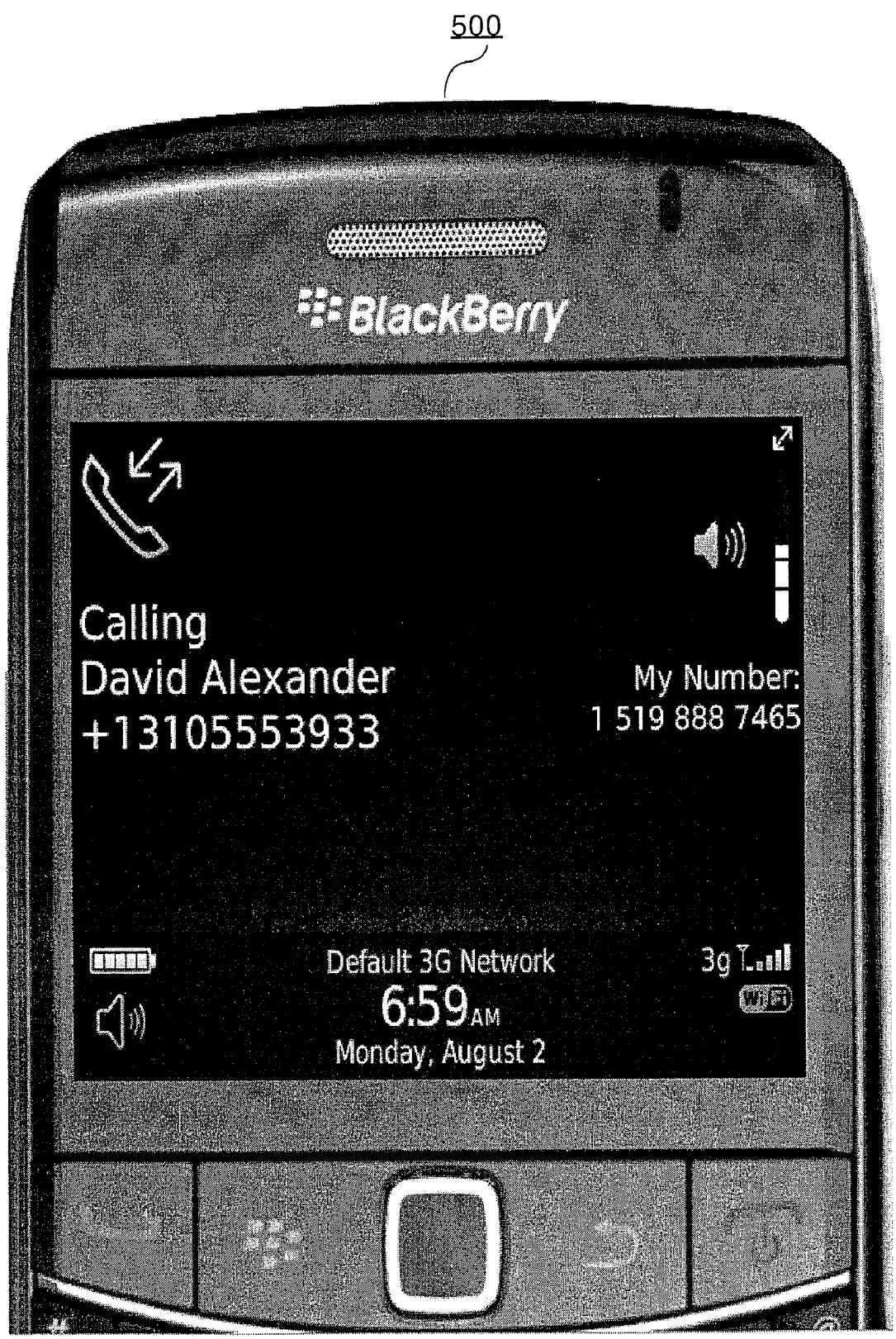
FIG. 5 is an example screen display for a mobile device showing the mobile device connecting to a called party.

For example, FIG. 5 shows an example screen display for a display of a mobile phone that has initiated a call in response to a user selecting the "Call" option from menu 402. After the user selects the "Call" option, control passes to the mobile phone's call service as shown by display 500. According to one embodiment, message management application 130 continues executing as a background process during the call. This approach allows the user to make the phone call and connect with the target without exiting message management application 130.

3.3 Automatic Message Management in Response to Completion of a Connection

In step 1112, the user is prompted to update the particular active message record upon completing the connection with the target. By automatically prompting the user to update the active message record, management of these records becomes an integral and natural part of the call process, which results in an up-to-date customized message lists with minimal effort on the part of the user.

In one embodiment, the user is prompted for input regarding whether to add the recently completed connection to the message records. In such an embodiment, step 1114 comprises determining whether to create an active message record for the completed connection based on the user input. If the determination is "Yes," then a new call record is created for the completed connection at step 1116. Otherwise, the process continues to step 1118 without creating a call record.

Figure 6:
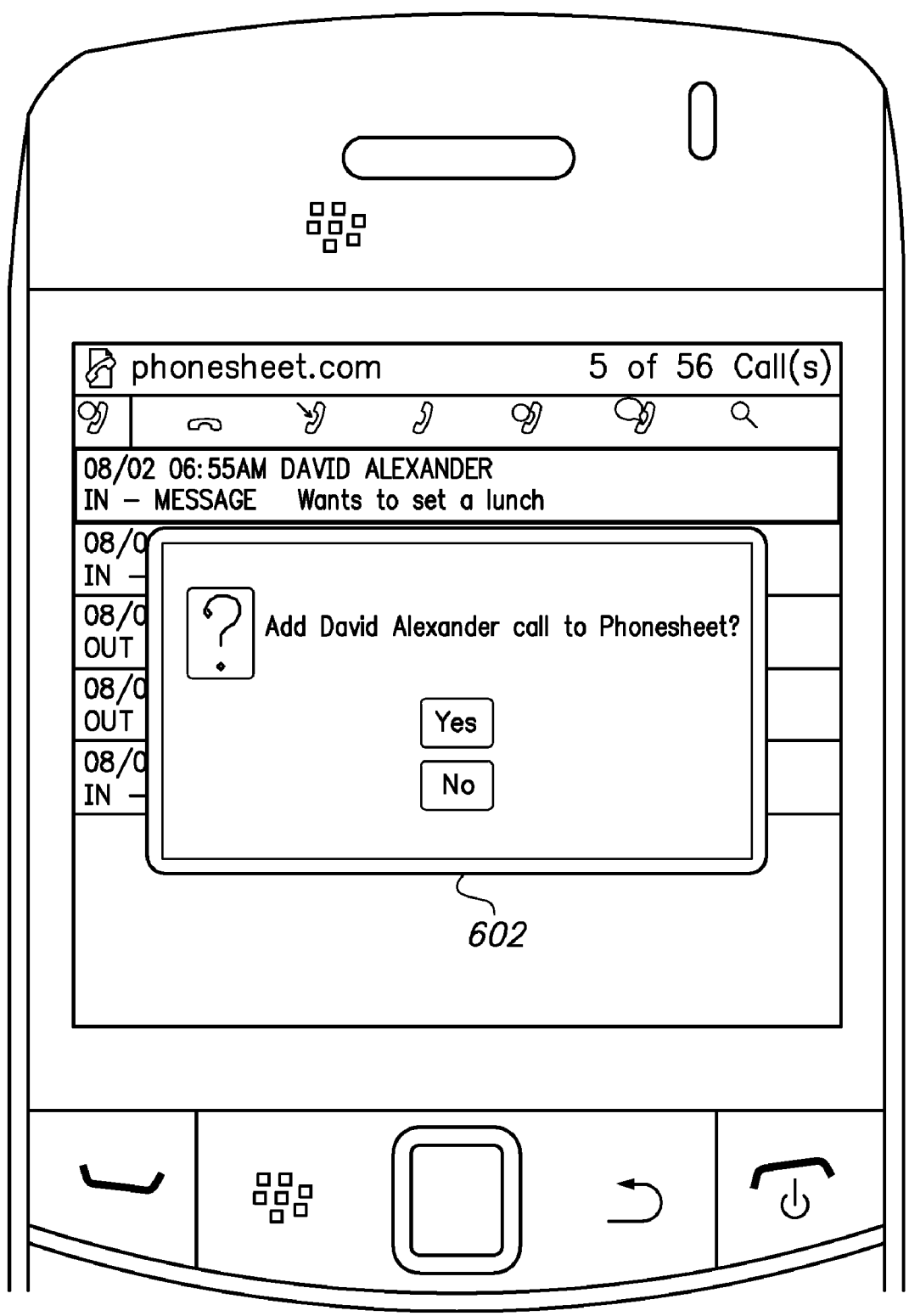
FIG. 6 is an example screen display for a mobile device showing a prompt to add a recently completed call to a list of active call records.

An example embodiment of step 1112 to step 1116 is illustrated by FIG. 6 and FIG. 7. FIG. 6 is an example screen display for a mobile device showing a prompt to add a recently completed call to a list of active call records according to an embodiment. This prompt is generated and displayed automatically as a popup window 602 in response to the completion of the call shown in FIG. 5. During the call, message management application 130 passes control to the call service of the mobile phone. During the call, message management application 130 remains running as a background process. After the completion of the call, control passes back to message management application 130. Thus, popup window 602 is displayed without an additional request from the user.

FIG. 7 is an example screen display for a mobile device showing a call record according to one embodiment. In response to the user selecting "Yes" from popup window 602, message management application 130 retrieves details about the call from a call log maintained by the mobile phone and from the previous active call record from which the call was generated.

In one embodiment, call record details include the date and time the connection was made with the target. For example, Call Date 702 indicates the date and time of the call shown in FIG. 5.

In one embodiment, call record details include information about whether the message was incoming or outgoing. For example, FIG. 7 shows In/Out drop-down list 704. This information is automatically selected based on whether the mobile phone generated the call or received the call.

In one embodiment, call record details include contact information about the target. Contact information 706 includes the name, company, phone number, and phone type of the target. Other contact information may also be included, depending on the embodiment. The contact information may be obtained from the call log or contact information saved by message management application 130.

In one embodiment, call record details include a call type if the call record is active. Referring to FIG. 7, the user may select the call type by using Call Type drop-down list 708.

In one embodiment, the call record details include the call type "Left Message." This call type indicates that a message was left with a target if the call is outgoing. Conversely, this call type indicates that a target left a message if the call is incoming. This option may be selected when a message has been left and a response is expected.

In one embodiment, the call record details include the call type "Pending." This call type indicates that a call to a target is expected to be made if the call is outgoing. Conversely, this call type indicates that a call from a target is expected if the call is incoming. This call type may be selected when no message was left, but a call from or to a target is still expected.

In one embodiment, the call record details include the call type "Completed." This call type indicates that no outgoing or incoming calls are expected or need to be made. However, the user may wish to keep the record active if an item of business related to the call record still needs to be addressed.

In one embodiment the call record details include a user-defined call type. This allows the user flexibility to categorize and organize call records to fit the user's particular needs. Each user-defined call type may be associated with a color and a priority level, as noted above.

In one embodiment call record details include information about whether the call record is active or inactive. Referring to FIG. 7, if active checkbox 710 is checked, then the call record is active. Conversely, if the active checkbox 710 is unchecked, then the call record is inactive. The call record will only be displayed on the active message list if this box is checked.

In one embodiment, call record details include call notes. The notes may be automatically populated with notes from previous call records. Referring to FIG. 7, notes 712 includes notes that have been newly added by the user (i.e., "Suggested a sushi restaurant.") and notes from previously records (i.e., "Wants to set a lunch.") Notes from previous call records are automatically pushed below line 714. Thus, the user can track messages from calls back-and-forth with a particular target for a particular matter.

In one embodiment, the user is prompted for input regarding whether to deactivate the particular active message record. In such an embodiment, step 1118 comprises determining whether to deactivate the particular active message record based on the input received. If the determination is "Yes," then the particular active message record is removed from the active message list and moved to the archives at step 1120. Once deactivated, the particular active call record becomes "inactive" and is removed from the active call list. The record is then archived. If the determination of step 1118 is "No," the process continues to step 1122.

Figure 8:
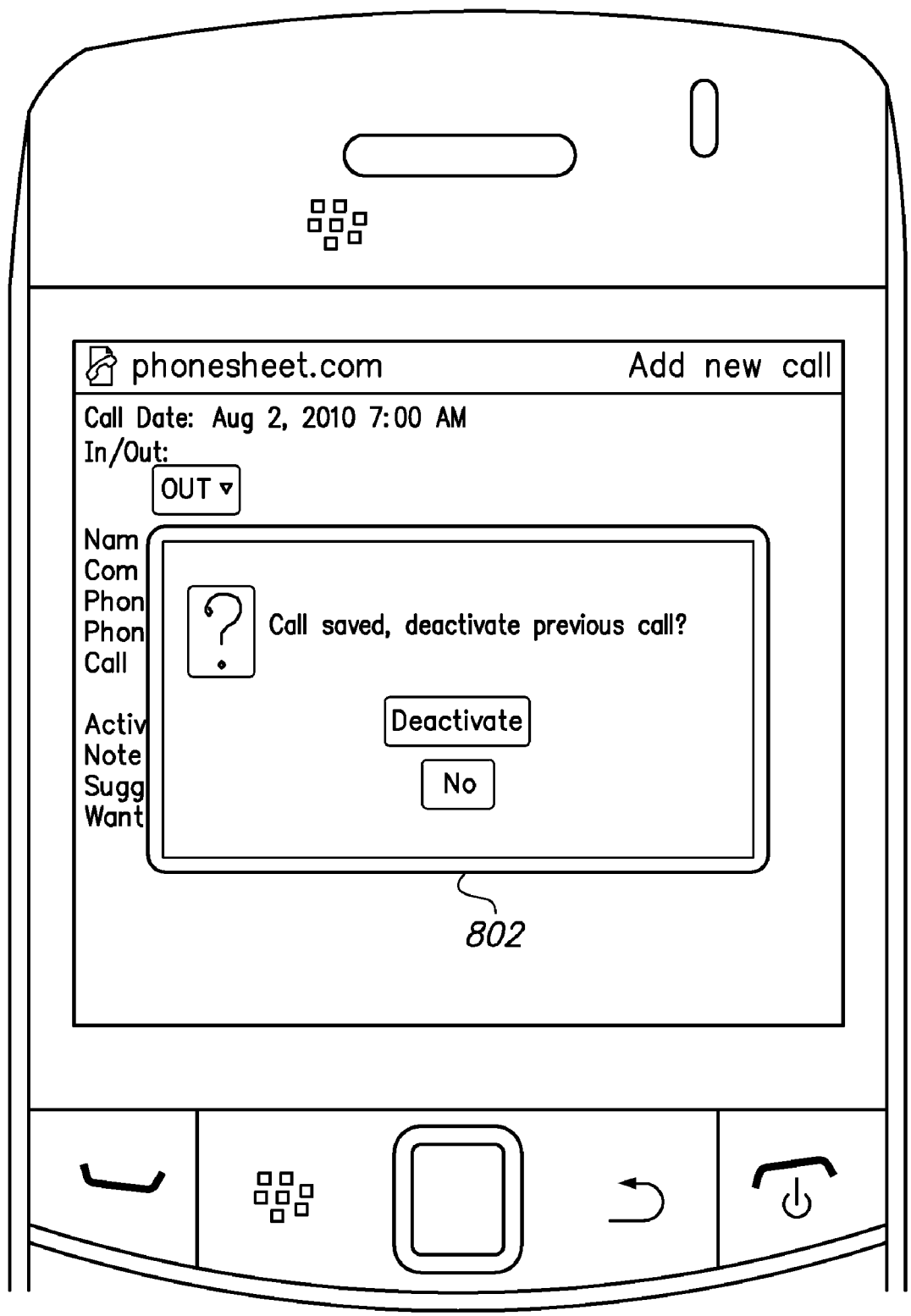
FIG. 8 is an example screen display for a mobile device showing a prompt to deactivate a previously active call record.

FIG. 8 is an example screen display for a mobile device showing a prompt to deactivate a previously active call record according to an embodiment. After the user saves a new record for the completed connection, message management application 130 presents popup window 802, which prompts the user whether to deactivate the previous call message record. As a new call record has been created for the outgoing call, two messages related to the same target exist in the database on termination of the outgoing call. In the approach herein, application 130 automatically prompts the user about whether to deactivate the prior call record so that the user can rapidly archive the previous message and keep the Active Calls list view up-to-date and organized. The approach naturally facilitates consolidation and aggregation of call records within the same application 130 that was used to find a call record and initiate the call.

In step 1122, an updated message list is generated and displayed. Thus, if the user created a new active call record at step 1116, this record is displayed. If the user deactivated the particular active call record at step 1118, this record is removed from the list.

Figure 9:
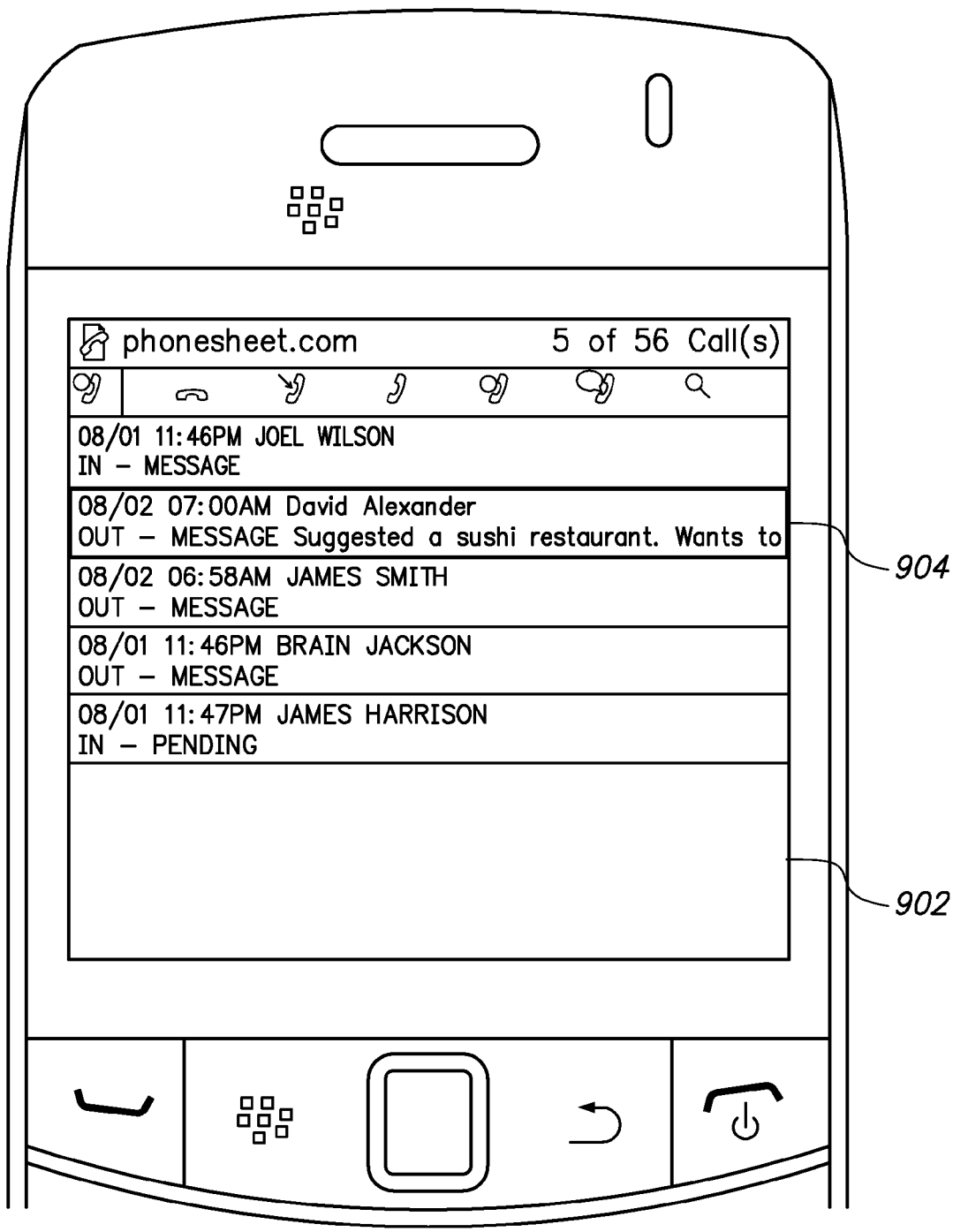
FIG. 9 is an example screen display for a mobile device showing an updated list of active call records.

FIG. 9 is an example screen display for a mobile device showing an updated list of active call records according to an embodiment. After responding to the automatic prompts, the user is returned to the Home Screen with a view of updated Active Calls list 902. Thus, newly created record 904 for "David Alexander" is added to the Active Calls list, and the previous active call record for "David Alexander" is removed.

4.0 Web Interface for Managing Call Records

According to an embodiment, call records from the mobile phone are synchronized with an instance of application 130 running on a web server at a server computer location. If message records are generated, deleted, or otherwise updated at the mobile phone, then the mobile phone automatically sends this information to a database coupled to the web server. Thus, any updates to call records by the mobile phone become available online.

Similarly, messages may be generated, deleted, or otherwise updated through a web interface. For example, a third party using a networked personal computer, laptop or other computing database can use a browser-based application to connect over the Internet to the call records associated with a particular mobile phone user. After presenting appropriate authentication credentials such as a username and password and completing an authentication check, third party can enter new call records or update existing call records on behalf of, or for, the mobile phone user. Any updates to call records made through the web interface are pushed to the mobile phone. This enables parties that do not have access to the mobile phone to create message records for the mobile phone. Thus, multiple parties may assist in tracking important phone calls.

FIG. 10 is a screenshot of a browser application displaying web interface 1000 through which message records may be created, viewed, and edited in accordance with an embodiment. The home screen for the web interface displays the active call 1008 records for a user. Filters 1010 allow the user to toggle which records are displayed by web interface 1000 in the manner described above for filters 208.

Web interface 1000 includes a button 1002 that allows the user to create a new call record. In response to user input selecting button 1002, web interface 1000 prompts the user for call details similar to those shown in FIG. 7. After entering the call details, a new record is created and added to the call records. This information is then sent to the mobile phone 102, which synchronizes and stores the information in its own database Web interface 1000 further includes a button 1004 that allows the user to add new contact information. If the user selects this button, then web interface 1000 prompts the user for contact information for the new contact, such as name, phone number, email, etc. Once the user enters the information, the contact information is saved, but a record is not created. This information is sent, synchronized, and stored in the mobile phone's database. The contact information may subsequently be used to automatically populate call record details.

Web interface 1000 includes a button 1006, which allows the user to deactivate one or more active call records 1012, and button 1008, which allows the user to delete one or more active call records 1012.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
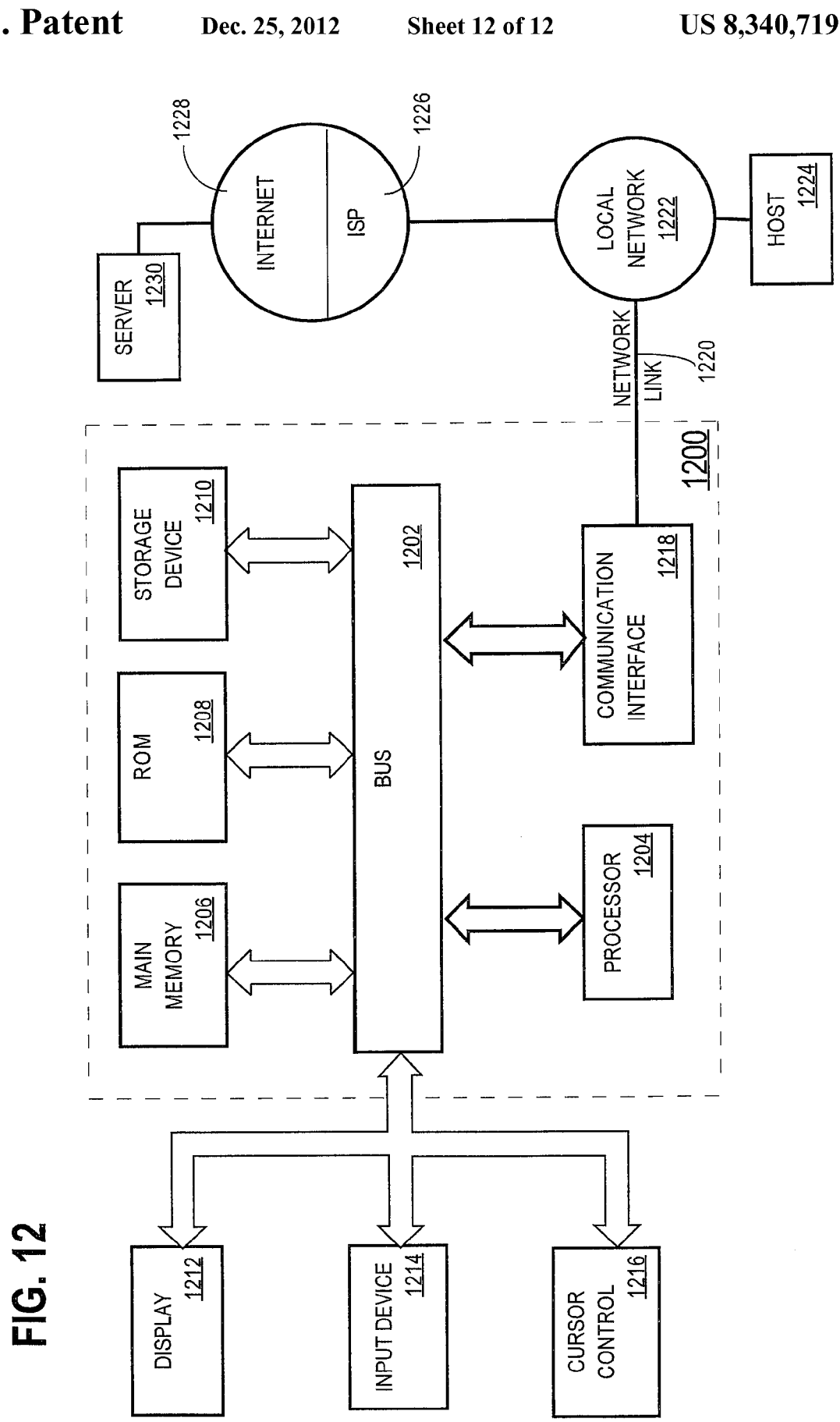
FIG. 12 illustrates a computer system upon which an embodiment may be implemented.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   displaying, in a user interface of a mobile device, using a message management application hosted on the mobile device, a list of active call records that indicate a plurality of called party targets;
   receiving, at the mobile device, a first user input selecting a first active call record for a particular target from within the list;
   in response to the first user input, initiating a call from the mobile device to the particular target by invoking a call application hosted on the mobile device and without terminating operation of the message management application;
   after completion of the call, creating and storing a second active call record associated with the call and redisplaying the list;
   receiving third user input to create a new note for the second active call record;
   adding the new note to the second active call record;
   displaying the new note is displayed above the one or more notes from the first active call record;
   wherein each active call record on the list of active call records are color-coded based on a call type associated with the each active call record;
   wherein the steps of the method are performed by one or more computing devices.

2. The method of claim 1 further comprising generating and displaying a prompt for second user input to update an activity status of the first call record; deactivating the first call record in response to the second user input and redisplaying the list without the first call record.

3. The method of claim 1, wherein the first active call record comprises one or more notes and further comprising automatically populating the second active call record with the one or more notes from the first active call record.

4. The method of claim 1, further comprising automatically populating the second active call record with information obtained from a native call log of the mobile phone.

5. The method of claim 1 further comprising in response to the second user input, deactivating the first active call record for the particular target; wherein deactivating the first active call record comprises removing the first active call record from the active call list and adding the first active call record to an archive of inactive call records.

6. The method of claim 1, wherein at least one active call record on the list of active call records is created by a remote device that is different from the mobile phone.

7. The method of claim 1, wherein the mobile device comprises a BLACKBERRY smartphone.

8. The method of claim 1 further comprising receiving the list of active call records from a remotely located server.

9. A non-transitory computer-readable medium carrying one or more sequences of instructions, which, when executed by one or more processors, cause the one or more processors to carry out the steps of:
   displaying, in a user interface of a mobile device, using a message management application hosted on the mobile device, a list of active call records that indicate a plurality of called party targets;
   receiving, at the mobile device, a first user input selecting a first active call record for a particular target from within the list;
   in response to the first user input, initiating a call from the mobile device to the particular target by invoking a call application hosted on the mobile device and without terminating operation of the message management application;
   after completion of the call, creating and storing a second active call record associated with the call and redisplaying the list;
   further comprising instructions which when executed cause receiving third user input to create a new note for the second active call record;
   adding the new note to the second active call record;
   displaying the new note is displayed above the one or more notes from the first active call record;
   each active call record on the list of active call records are color-coded based on a call type associated with the each active call record.

10. The computer-readable medium of claim 9 further comprising instructions which when executed cause generating and displaying a prompt for second user input to update an activity status of the first call record; deactivating the first call record in response to the second user input and redisplaying the list without the first call record.

11. The computer-readable medium of claim 9, wherein the first active call record comprises one or more notes and further comprising instructions which when executed cause automatically populating the second active call record with the one or more notes from the first active call record.

12. The computer-readable medium of claim 9, further comprising instructions which when executed cause automatically populating the second active call record with information obtained from a native call log of the mobile phone.

13. The computer-readable medium of claim 9 further comprising instructions which when executed cause, in response to the second user input, deactivating the first active call record for the particular target; wherein deactivating the first active call record comprises removing the first active call record from the active call list and adding the first active call record to an archive of inactive call records.

14. The computer-readable medium of claim 9, wherein at least one active call record on the list of active call records is created by a remote device that is different from the mobile phone.

15. A cellular radiotelephone data processing apparatus comprising:
   one or more processors;
   one or more stored sequences of instructions which, when executed by the one or more processors, cause the one or more processors to perform:

displaying, in a user interface of the apparatus, using a message management application hosted on the mobile device, a list of active call records that indicate a plurality of called party targets;

receiving, at the mobile device, a first user input selecting a first active call record for a particular target from within the list;

in response to the first user input, initiating a call from the mobile device to the particular target by invoking a call application hosted on the mobile device and without terminating operation of the message management application;

after completion of the call, creating and storing a second active call record associated with the call and redisplaying the list;

third user input to create a new note for the second active call record;

adding the new note to the second active call record;

displaying the new note is displayed above the one or more notes from the first active call record;

and each active call record on the list of active call records are color-coded based on a call type associated with the each active call record.

16. The apparatus of claim 15, further comprising sequences of instructions which, when executed by the processor, cause the processor to perform comprising generating and displaying a prompt for second user input to update an activity status of the first call record; deactivating the first call record in response to the second user input and redisplaying the list without the first call record.

* * * * *